United States Patent
Clarke et al.

(10) Patent No.: US 10,329,128 B2
(45) Date of Patent: Jun. 25, 2019

(54) SPARE WHEEL ASSEMBLY WINCH WITH FORCE DEPENDENT CABLE RELEASE MECHANISM

(71) Applicant: Ford Global Technologies, LLC, Dearborn, MI (US)

(72) Inventors: Jonathan Clarke, Troy, MI (US); Kyu Yearl Choe, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 198 days.

(21) Appl. No.: 15/363,278

(22) Filed: Nov. 29, 2016

(65) Prior Publication Data
US 2018/0148307 A1 May 31, 2018

(51) Int. Cl.
*B66D 1/60* (2006.01)
*B62D 43/04* (2006.01)
*B66D 1/00* (2006.01)
*B66D 1/12* (2006.01)

(52) U.S. Cl.
CPC ............. *B66D 1/60* (2013.01); *B62D 43/045* (2013.01); *B66D 1/005* (2013.01); *B66D 1/12* (2013.01); *B66D 2700/0141* (2013.01)

(58) Field of Classification Search
CPC .......... B62D 43/045; B66D 1/40; B66D 1/58; B66D 2700/026
See application file for complete search history.

(56) References Cited

U.S. PATENT DOCUMENTS

| | | |
|---|---|---|
| 3,874,536 A | 4/1975 | Watanabe |
| 4,377,366 A | 3/1983 | Hamlyn |
| 4,535,973 A | 8/1985 | Dorr et al. |
| 4,884,785 A | 12/1989 | Denman et al. |
| 5,251,877 A | 10/1993 | Rempinski et al. |
| 5,954,246 A | 9/1999 | Golovoy et al. |
| 6,443,846 B1 | 9/2002 | Dziedzic et al. |
| 6,554,253 B1 | 4/2003 | Dobmeier et al. |
| 7,007,928 B2 | 3/2006 | Van Cor |
| 7,073,779 B1 | 7/2006 | Dobmeier et al. |
| 7,404,545 B2 | 7/2008 | Steiner et al. |

(Continued)

FOREIGN PATENT DOCUMENTS

| | | | |
|---|---|---|---|
| EP | 0491513 | 6/1994 | |
| GB | 890011 A | * 2/1962 | ............... B66D 1/14 |

*Primary Examiner* — Emmanuel M Marcelo
(74) *Attorney, Agent, or Firm* — LeClairRyan

(57) ABSTRACT

A spare wheel assembly winch having a force dependent cable release mechanism is disclosed. In one embodiment, the sheave includes a series of breakaway features that can be torn if the tension on the spare tire cable exceeds the predetermined level, thus allowing the inner, gear-containing portion of the sheave to rotate independently of the outer, cable-holding portion. In another embodiment, the sheave includes a series of breakaway notches formed on the gear teeth of the internal gear. In a further embodiment, a frangible tab extends from torque plate into a depression formed in the cover plate. In yet another embodiment, a tear feature extends from the housing and is situated adjacent the torque plate arm. In an additional embodiment, frangible tabs extend from the body of the sheave into a geared insert. In still another embodiment, a frangible tab extends from a geared insert into the torque plate.

18 Claims, 5 Drawing Sheets

(56) References Cited

U.S. PATENT DOCUMENTS

| | | |
|---|---|---|
| 7,621,507 B2 | 11/2009 | Reznar |
| 8,857,898 B1 | 10/2014 | Dubaisi et al. |
| 2001/0010369 A1* | 8/2001 | Dobmeier ............ B62D 43/045 254/323 |
| 2006/0169958 A1* | 8/2006 | Steiner, Jr. ............ B62D 43/00 254/323 |
| 2009/0032786 A1* | 2/2009 | Steiner, Jr. ............ B62D 43/00 254/323 |

* cited by examiner

SPARE WHEEL ASSEMBLY WINCH WITH FORCE DEPENDENT CABLE RELEASE MECHANISM

TECHNICAL FIELD

The disclosed inventive concept relates generally to a spare wheel assemblies for vehicles. More particularly, the disclosed inventive concept relates to a spare tire winch having a force dependent cable release mechanism. The mechanism allows the sheave of the winch to turn when the tension on the cable reaches a predetermined force level. This occurs by a tab or other frangible component being torn or otherwise sheared from one of the sheave, sheave housing, or torque plate, thereby allowing controlled paying out of the cable.

BACKGROUND OF THE INVENTION

A spare wheel assembly is an extra wheel assembly carried in a vehicle that can function as a replacement for a road wheel that is no longer capable of functioning. The spare wheel assembly may be carried in any of a number of locations on the vehicle, the most typical being in a spare wheel well formed in the trunk of the vehicle. However, spare wheel assemblies are frequently being carried under the rear of the vehicle attached by a cable that holds the wheel tightly against to the vehicle frame of the vehicle when stowed. This is the case because sport utility vehicles are increasingly the vehicle of choice for drivers. The cable is conventionally attached to a motor driven or hand cranked winch to regulate movement of the cable from its raised, wheel-stowed position to its lowered, wheel-accessible position when needed to replace a non-functioning road wheel.

While the winch arrangement for the raising and lowering of the spare wheel assembly has provided effective and proven reliability as a part of a spare wheel storage arrangement, known systems are always subject to further development. For example, during an impact event, the tension on the cable is frequently significantly higher than during normal use. The increased tension on the cable can lead to the cable breaking from cable tension or being cut on an edge of the vehicle's frame, body or winch.

Accordingly, it may be beneficial to release tension on the spare tire cable to prevent the cable from being overloaded with tension exceeding its breaking strength. If the cable pays out of the winch (thereby releasing tension) when tension is much higher than normal operating levels in a crash, the cable will not break and is unlikely to be cut on part of the vehicle.

As in so many areas of vehicle technology there is always room for improvement related to spare wheel assembly and winch designs for use with automotive vehicles.

SUMMARY OF THE INVENTION

The disclosed invention overcomes the problems of known spare wheel assembly and winch designs by providing strategically located breakaway release arrangements that, when tension on the spare tire cable exceeds a predetermined level, the breakaway elements are torn or deformed so as to allow the cable to be payed out in a controlled manner, thus releasing tension on the cable. The disclosed inventive concept is expressed in six non-limiting embodiments.

In one embodiment of the disclosed inventive concept, the sheave includes a series of breakaway features that can be torn if the tension on the spare tire cable exceeds the predetermined level, thus allowing the inner, gear-containing portion of the sheave to rotate independently of the outer, cable-holding portion.

In another embodiment of the disclosed inventive concept, the sheave includes a series of breakaway notches formed on the gear teeth of the internal gear. The breakaway characteristics of the notches allow for initiation of separation of the gear outer portion, cable-holding portion.

In a further embodiment of the disclosed inventive concept, a frangible tab extends from torque plate into a depression formed in the cover plate. Movement of the frangible tab is limited by lateral frangible walls. Under a predetermined tension applied to the cable, one of the frangible walls is torn from its position, thus allowing the torque plate to rotate non-eccentrically, allowing the cable to pay out and cable tension to decrease.

In yet another embodiment of the disclosed inventive concept, a tear feature extends from the housing and is situated adjacent the torque plate arm. The tear feature prevents the torque plate from rotating non-eccentrically during normal operation but is torn or deformed at a predetermined level of force to allow rotation of the sheave and payout of the cable.

In an additional embodiment of the disclosed inventive concept, frangible tabs extend from the body of the sheave into a geared insert. In the event that a predetermined force is applied to the winch cable, the breakaway features are torn away from the sheave body, thereby allowing the sheave body to rotate, thus allowing payout of cable.

In still another embodiment of the disclosed inventive concept, a frangible tab extends from a geared insert into the torque plate. When a predetermined force is applied to the cable, the breakaway feature is torn from the torque plate body, allowing the torque plate body to rotate and thereby allowing the operatively associated sheave to payout the cable.

Additional variations of the breakaway feature on a winch beyond those described above and illustrated in the accompanying figures are possible and include, without limitation, the provision of a shear pin in place of or in addition to the frangible tab or other breakaway feature.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
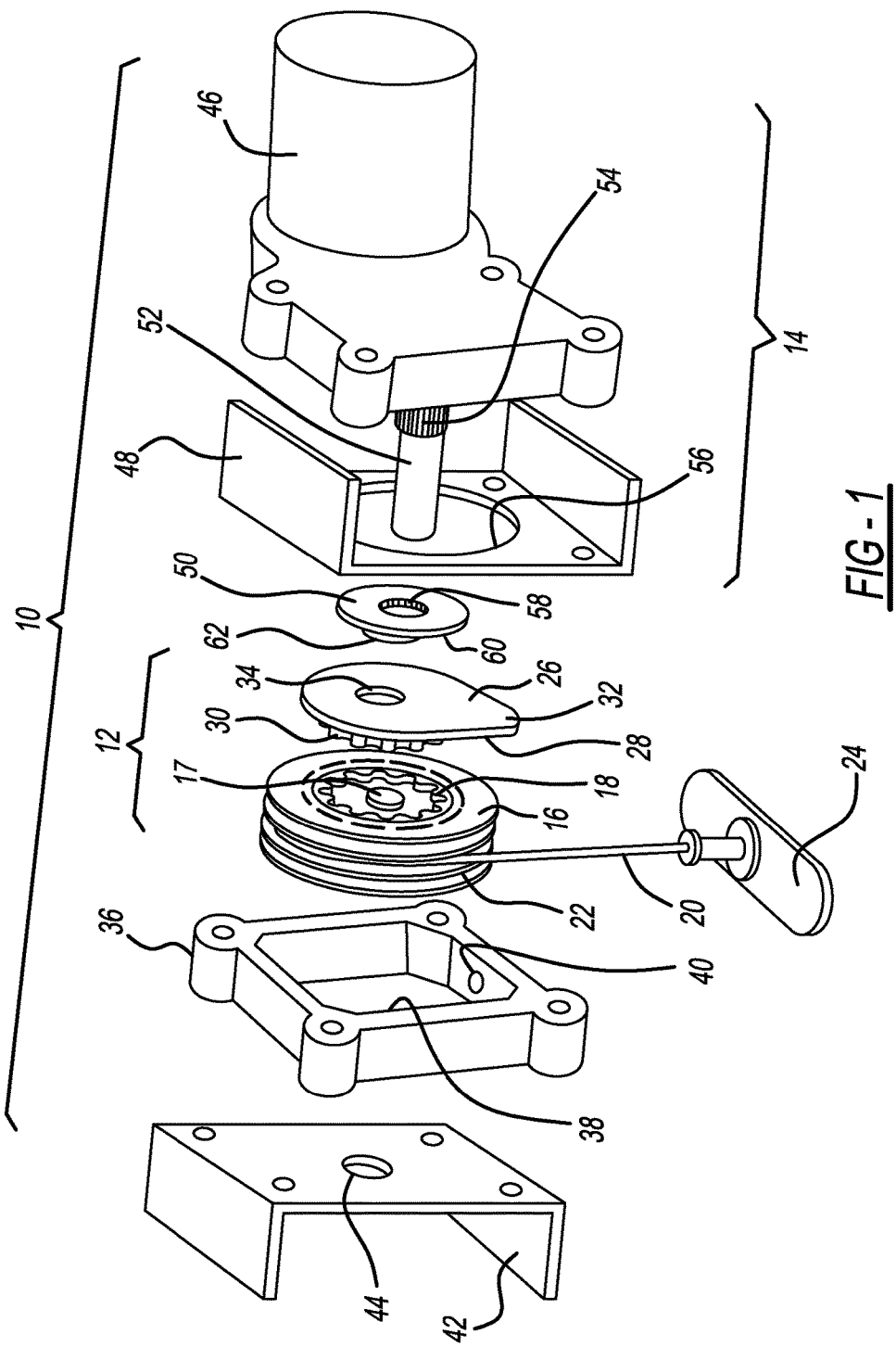
FIG. 1 is an exploded assembly view of a spare tire winch assembly according to one embodiment of the present invention.

In the following figures, the same reference numerals will be used to refer to the same components. In the following description, various operating parameters and components are described for different constructed embodiments. These specific parameters and components are included as examples and are not meant to be limiting.

Figure 3:
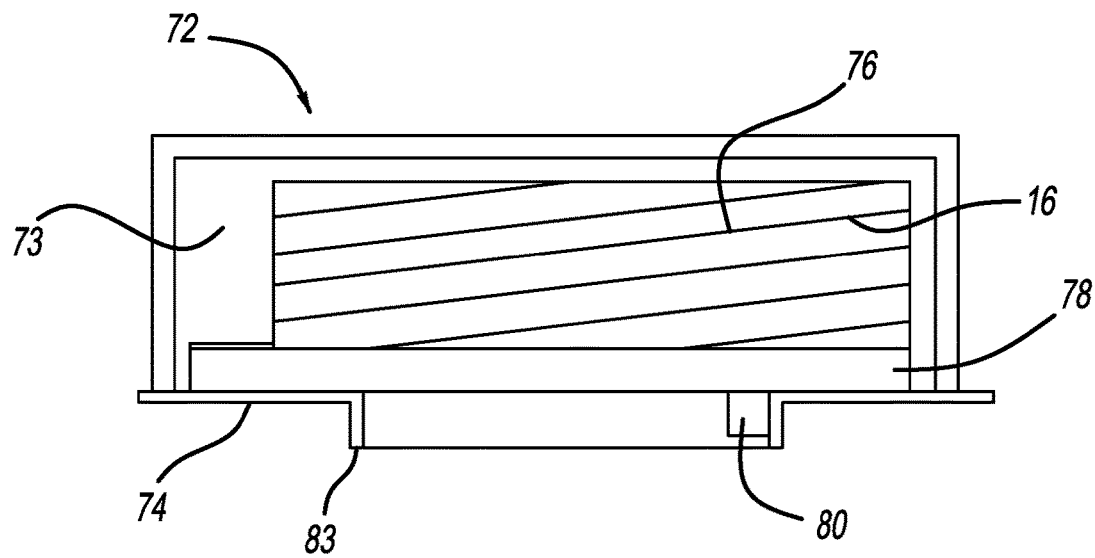
FIG. 3 is a sectional view of a sheave assembly illustrating a torque plate tab extending into a recessed area defining a travel path formed in the cover plate according to an additional embodiment of the disclosed inventive concept.
Figure 4:
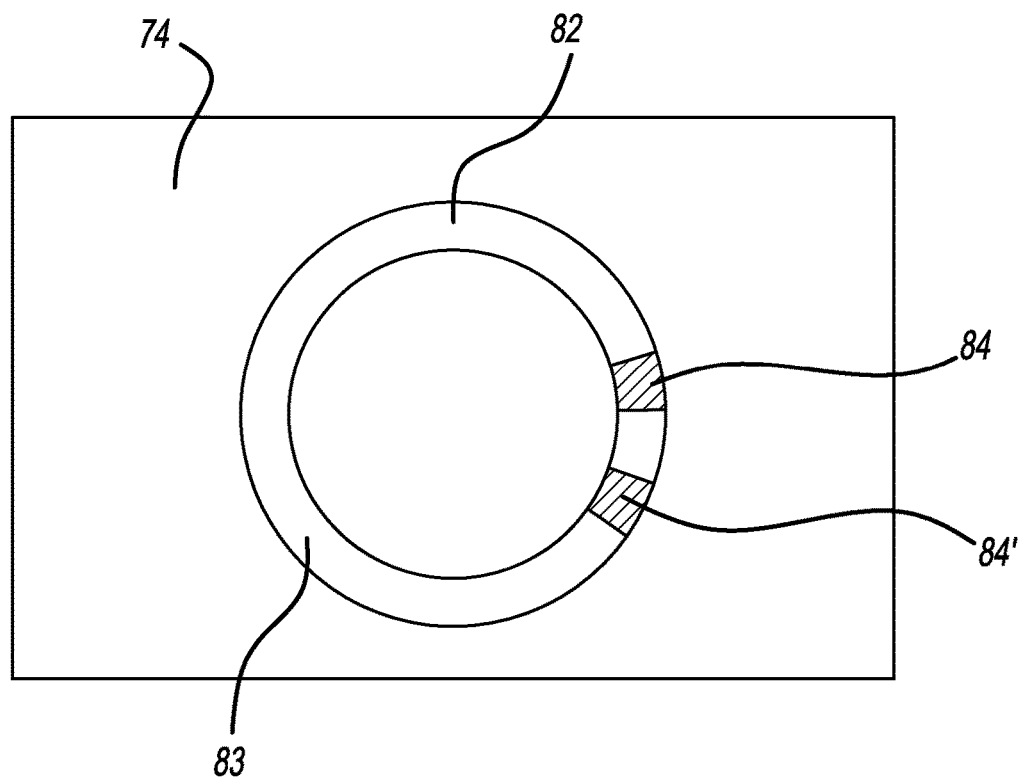
FIG. 4 is a top view of the cover plate having a breakaway wall and a path to accommodate the travel of a torque plate tab for use with the embodiment of the disclosed inventive concept illustrated in FIG. 3.
Figure 5:
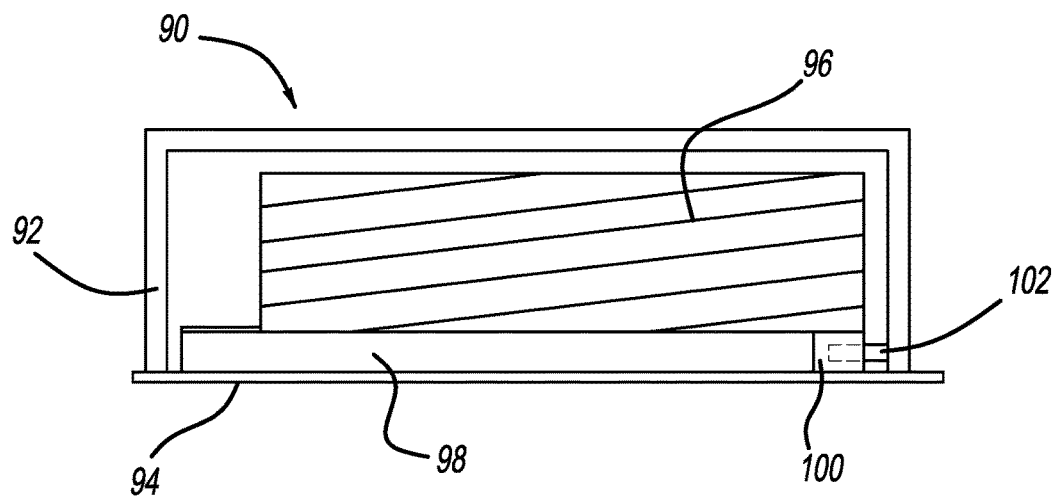
FIG. 5 is a sectional view of a sheave assembly illustrating the tear feature of a housing engaging a torque plate arm according to a further embodiment of the disclosed inventive concept.
Figure 6:
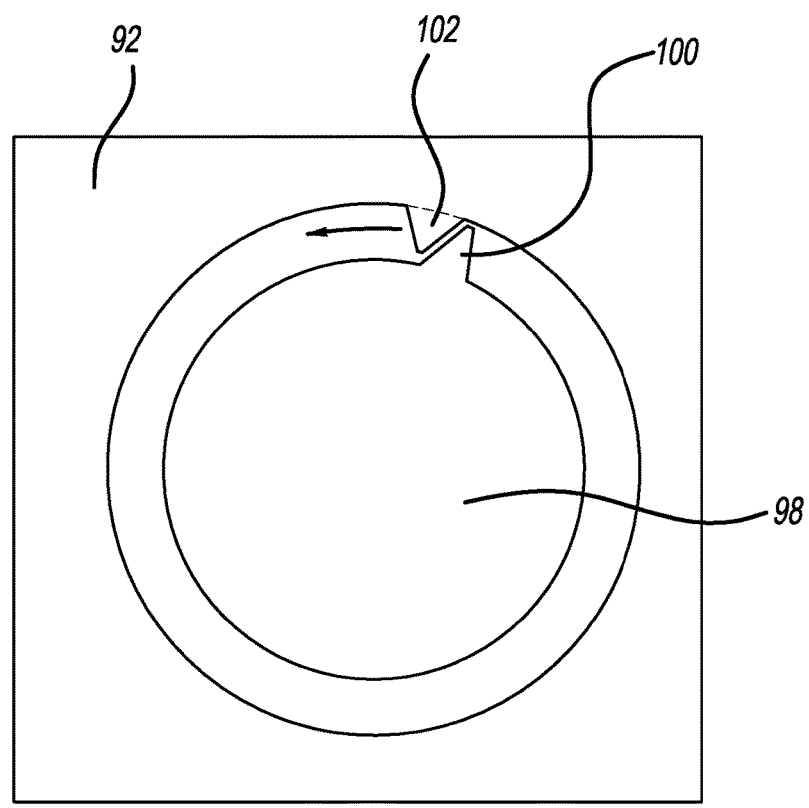
FIG. 6 is an underside view of the housing illustrating a tear feature shown in relation to the torque plate arm according to the embodiment illustrated in FIG. 5.
Figure 7:
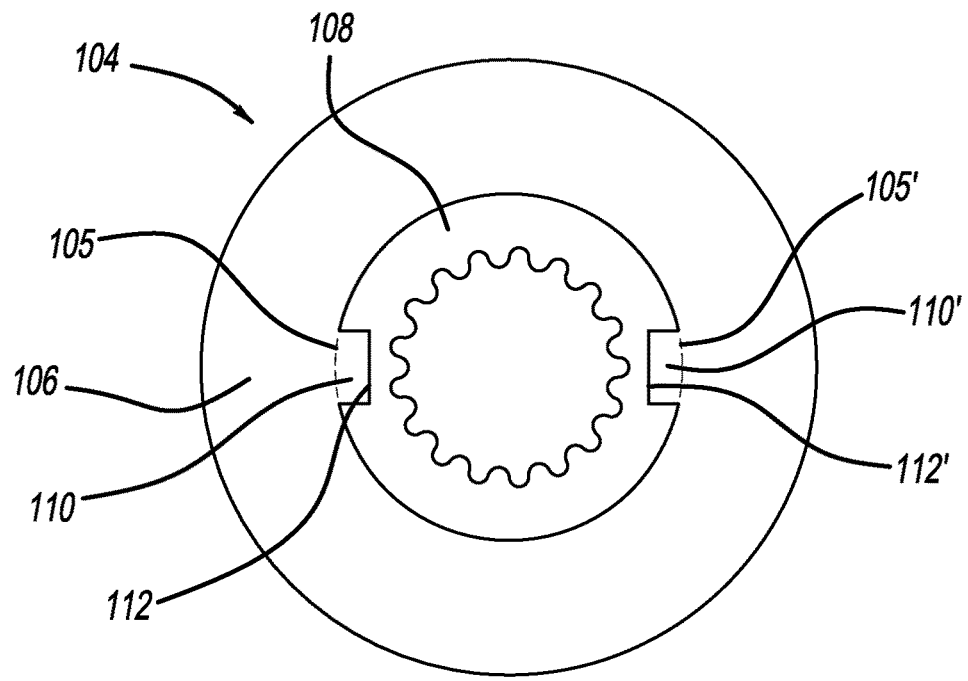
FIG. 7 is a view of the gear side of a sheave having a breakaway feature according to an additional embodiment of the disclosed inventive concept.
Figure 8:
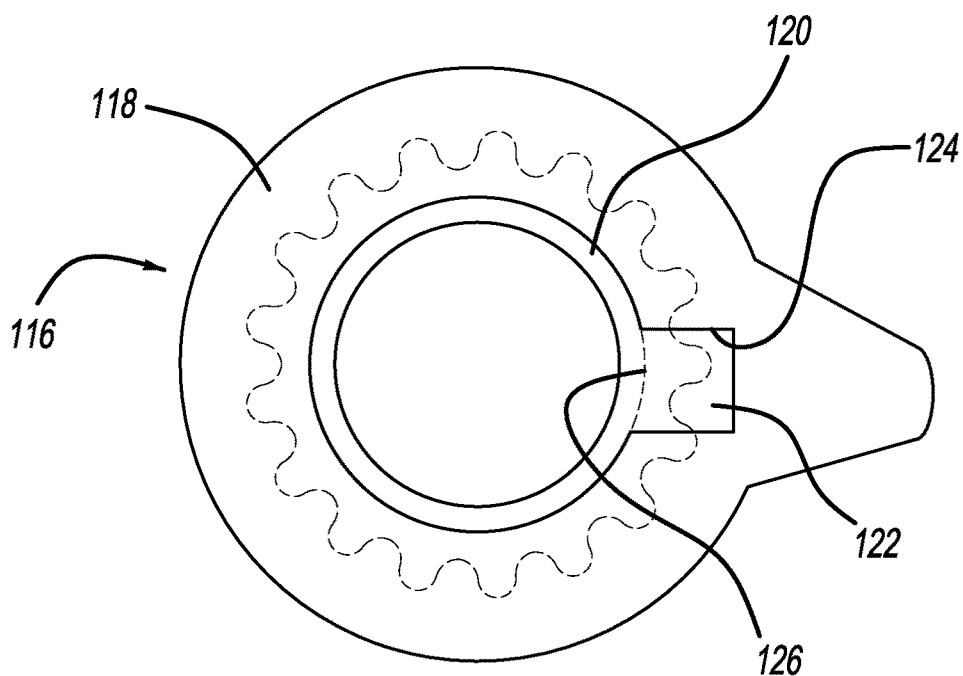
FIG. 8 is an underside view of a torque plate having a breakaway feature according to another embodiment of the disclosed inventive concept.

The figures illustrate preferred embodiments of the spare tire winch having a release mechanism according to the disclosed inventive concept. It is to be understood that the illustrated embodiments are suggestive and are not intended as being limiting. FIG. 1 illustrates the spare tire winch having a breakaway release mechanism illustrated in FIG. 2 in which either or both the sheave body and the gear teeth can initiate rotational separation of the torque plate relative to the sheave. FIGS. 3 and 4 illustrate an alternative breakaway release mechanism in which a fixed tab extends from torque plate into a depression formed on the cover plate. The fixed tab is positioned generally between two frangible walls. FIGS. 5 and 6 illustrate a further alternative breakaway release mechanism in which a tear feature extends from the housing and is situated adjacent the torque plate arm. FIG. 7 illustrates an additional alternative breakaway release mechanism in which frangible tabs extend from the body of the sheave into a geared insert. FIG. 8 illustrates a further variation of the disclosed inventive concept in which a frangible tab extends from a geared insert into the torque plate. It is to be understood that other variations of the disclosed inventive concept having frangible features is possible including, without limitation, the provision of a shear pin in place of or in addition to the frangible tab.

Referring to FIG. 1, a spare tire winch having a release mechanism, generally illustrated as 10, is shown in exploded view according to a first embodiment of the disclosed inventive concept. The spare tire winch 10 includes a sheave assembly 12 and a drive motor assembly 14. The sheave assembly 12 includes a sheave 16 having a shaft port 17, an internal gear 18 and a winch cable 20 that can be wrapped and unwrapped onto an outer cable-winding surface 22. A spare wheel plate 24 is attached to the winch cable 20.

The sheave assembly 12 further includes a torque plate 26 having a sheave-facing side 28. A sheave-engaging gear 30 is formed on the sheave-facing side 28. The torque plate 26 further includes an arm 32 and an eccentric member and shaft port 34. The sheave-engaging gear 30 engages the internal gear 18 of the sheave 16 in a known manner.

A sheave assembly housing 36 includes an interior space 38 which receives the sheave assembly 12. The winch cable 20 passes through a cable aperture 40 formed in the lower wall of the sheave assembly housing 36. A housing mounting plate 42 having a shaft port 44 fits to one side of the sheave assembly housing 36 to both close off one of the open sides of the sheave assembly housing 36 and to provide a structure for mounting the spare tire winch 10 to the vehicle (not shown).

The drive motor assembly 14 includes a drive motor and reducing gear combination 46, a drive motor and reducing gear combination support bracket 48, and an eccentric drive member 50. The drive motor and reducing gear combination 46 includes a drive shaft 52 having means for fixedly engaging the eccentric drive member 50 in the form of external splines 54. Other arrangements for locking the drive shaft 52 with the eccentric drive member 50 for rotation therewith are possible, including, for example, a key and keyway.

The combination support bracket 48 includes a central aperture 56 in which the eccentric drive member 50 may rotate. The combination support bracket 48 both closes off the other open side of the sheave assembly housing 36 and provides a support structure for the drive motor and reducing gear combination 46.

The eccentric drive member 50 includes an internal spline 58 for engagement with the external splines 54 of the drive shaft 52. The eccentric drive member 50 includes a sheave-facing side 60 that includes an eccentric member 62 that engages the eccentric member and shaft port 34 of the torque plate 26 for operation therewith as is known in the art. While the drive shaft 52 fixedly engages the eccentric drive member 50 due to the interlocking of the external splines 54 and the internal splines 58, the drive shaft 52 provides non-locking rotational support for the torque plate 26 and the sheave 16.

Figure 2:
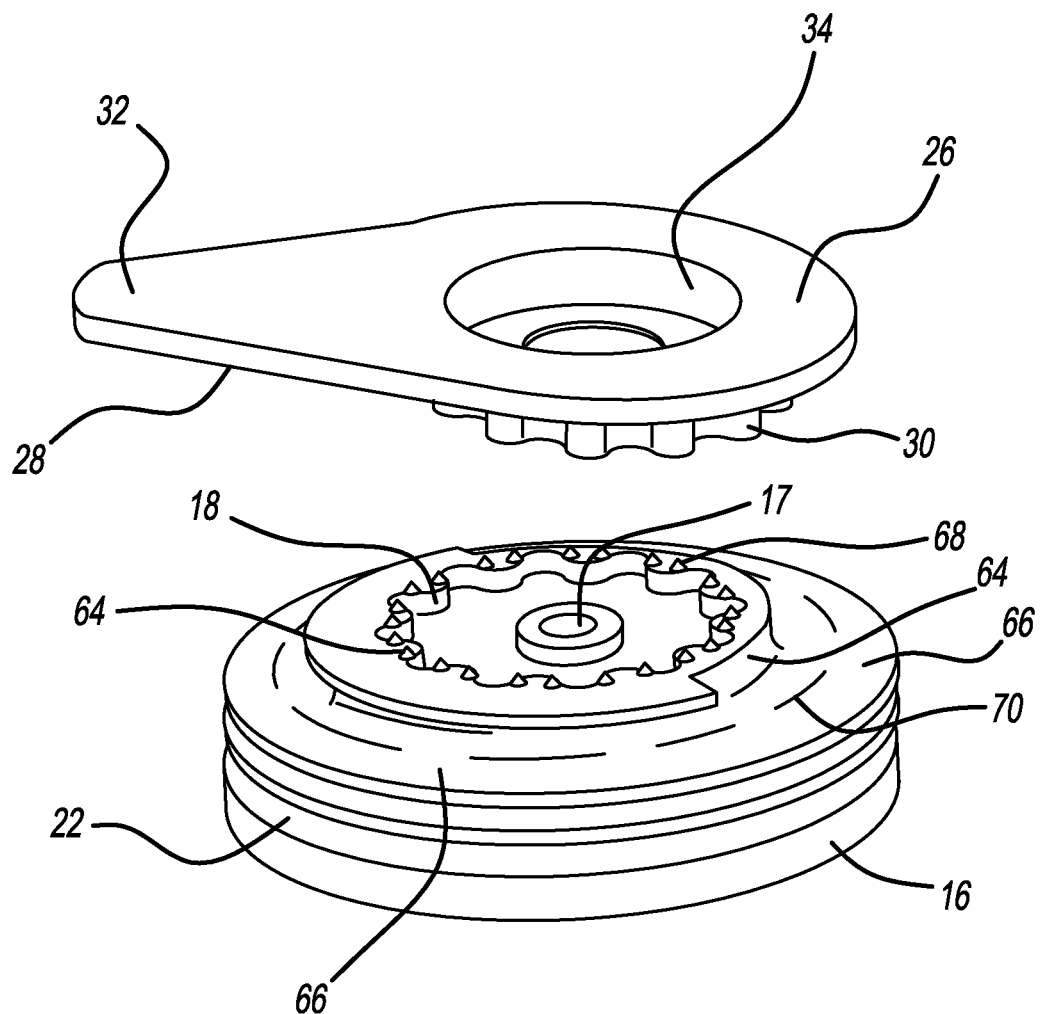
FIG. 2 is a perspective view illustrating the sheave having breakaway features in spaced-apart association with the torque plate of the embodiment illustrated in FIG. 1; the disclosed inventive concept.

The breakaway features of the embodiment of FIG. 1 are particularly illustrated in FIG. 2 which illustrates the torque plate 26 in spaced apart relation to the sheave 16. According to the embodiment illustrated in FIG. 2, exemplary breakaway features are formed as part of the sheave 16 that allow separation of an inner portion 64 of the sheave 16 from an outer portion 66. This feature includes a series of slots 70 formed on the body of the sheave 16. (The slots 70 may also be perforations or any other breakaway feature that is frangible at a predetermined load.) The breakaway characteristic of these elements allow for initiation of separation of sheave components such that the cable 20 may be payed out in a controlled manner based on predetermined torque or cable tension.

The breakaway features of the embodiment of FIG. 1 are also particularly illustrated in FIG. 2 which illustrates the torque plate 26 in spaced apart relation to the sheave 16. According to the embodiment illustrated in FIG. 2, exemplary breakaway features are formed on the sheave 16 as part of the gear teeth of the internal gear 18 that allow separation of the gear teeth 18 from the torque plate sheave-engaging gear 30. This feature includes a series of notches 68 formed on the gear teeth of the internal gear 18. (The notches 68 may also be perforations or any other breakaway feature that is frangible at a predetermined load.) The breakaway characteristic of these elements allow for initiation of separation of sheave and torque plate such that the cable 20 may be payed out in a controlled manner based on predetermined torque or cable tension. The notches 68 and slots 70 may be used alone or in combination.

Referring to FIGS. 3 and 4 another embodiment of the disclosed inventive concept is illustrated in which a cover plate has a breakaway wall and a path to accommodate the travel of a torque plate tab. As shown in FIG. 3, a sheave assembly, generally illustrated as 72, is shown in cross-section. The sheave assembly 72 includes a housing 73, a cover plate 74, a sheave 76, and a torque plate 78. The torque plate 78 includes a fixed tab 80 extending therefrom.

FIG. 4 illustrates the underside of the cover plate 74. A recessed area 82 is formed in a well 83 of the sheave-facing side of the cover plate 74. The recessed area 82 defines a travel path. A pair of spaced apart frangible walls 84 and 84' are formed in the recessed area 82 as part of the cover plate 74. The fixed tab 80 of the torque plate 78 is positioned between the frangible walls 84 and 84'.

During normal use, the disposition of the fixed tab 80 between the frangible walls 84 and 84' limits movement of the fixed tab 80, and thus rotation of the torque plate 78 which is attached to the sheave 76 through the gear on the sheave 76 (not shown) and the gear on the torque plate 78 (not shown). Restricting movement of the fixed tab 80 allows only normal eccentric gear rotation. During an impact event, a higher than normal cable tension force is transferred to the fixed tab 80 resulting in one of the frangible walls 84 and 84' tearing or deforming. As a result, the torque plate 78 rotates non-eccentrically, allowing the cable (not shown) to pay out and cable tension to decrease. The required amount of tension needed to tear or deform one of the frangible walls 84 or 84' and and/or a portion of the cover plate 74 is tuned through geometry and wall thickness of the cover plate 74 and the geometry of the fixed tab 80. The recessed area 82 is large enough to give clearance in the radial direction for the fixed tab 80 to move back and forth as the torque plate 78 rotates eccentrically during normal winching (cable take in) operation. The cover plate 74 contains a free path for the fixed tab 80 to travel in after it initially deforms or tears the recessed area 82 geometry.

Referring to FIGS. 5 and 6 an additional embodiment of the disclosed inventive concept is illustrated in which the sheave housing has a tear feature that may be torn by a fixed tab extending from the torque plate. As shown in FIG. 5, a sheave assembly, generally illustrated as 90, is shown in cross-section. The sheave assembly 90 includes a housing 92, a cover plate 94, a sheave 96, and a torque plate 98. The torque plate 98 includes a fixed arm 100 extending therefrom.

FIG. 6 illustrates the underside of the cover plate 94. A tear feature 102 is formed as part of the housing 92 and extends therefrom. The fixed arm 100 is positioned adjacent the tear feature 102. According to the embodiment of FIGS. 5 and 6, the tear feature 102 prevents the torque plate 98 from rotating non-eccentrically during normal operation but is torn or deformed at a predetermined level of force to allow rotation of the sheave 96 and payout of the cable (not shown). The fixed arm 100 of the torque plate 98 tears or deforms the tear feature 102 in such a way that only the part of the housing 92 involved in the release geometry is torn while the remainder of the housing 92 allows the fixed arm 100 of the torque plate 98 to rotate freely. Free rotation of the fixed arm 100 maintains the structural integrity of the housing 92 so that it still retains the torque plate 98 and sheave 96. This arrangement is preferred over the possible alternative arrangement in which the fixed arm 100 of the torque plate 98 is allowed to deform or break the housing 92 all the way around the circumference, thereby compromising the structural integrity of the housing 92.

As a further variation of the disclosed inventive concept, the gear in the sheave may itself become separated from the surrounding body. This arrangement is illustrated in FIG. 7 in which a view of the gear side of a sheave, generally illustrated as 104, is shown. The sheave 104 includes a sheave body 106 within which is fitted an internal gear 108. The gear 108 is retained in the sheave body 106 and is held against rotation within the sheave body 106 by the provision of a pair of spaced-apart breakaway features 110 and 110'. The breakaway features 110 and 110' are respectively recessed in breakaway feature-receiving slots 112 and 112'. When a predetermined force is applied to the cable (not shown), the breakaway features 110 and 110' are torn away from the sheave body 106 along break lines 105 and 105' respectively, thereby allowing the sheave body 106 to rotate thereby allowing the payout of cable. Free rotation of the sheave body 106 eliminates the need to rotate the torque plate non-eccentrically to release tension.

An additional variation of the disclosed concept is shown in FIG. 8 in which the gear of the torque plate may itself become separated form the torque plate. Particularly, a torque plate 116 is generally illustrated. The torque plate 116 includes a torque plate body 118 in which a gear 120 is centrally provided. The gear 120 is retained in the torque plate body 118 by provision of a breakaway feature 122. The breakaway feature 122 is recessed in a breakaway feature-receiving slot 124. When a predetermined force is applied to the cable (not shown), the breakaway feature 122 is torn away from the torque plate body 118 along a break line 126, thereby allowing the torque plate body 118 to rotate and thus allowing the operatively associated sheave to payout the cable. As noted above, the free rotation of the sheave eliminates the need to rotate the torque plate non-eccentrically to release tension.

Additional variations of the breakaway feature on a winch beyond those described above and illustrated in the accompanying figures are possible. For example, a breakaway insert in either the sheave or the torque plate that allows the part to which it mates (the torque plate or the sheave respectively) to rotate independent from the torque plate arm may be provided. Furthermore, a protrusion from the sheave or the torque plate into the mating part that shears off may be provided. Furthermore, a discrete component such as a shear pin mating the torque plate to the sheave may be included as an additional alternative.

Accordingly, based on the disclosed inventive concept as illustrated in the figures and as described above, it is to be understood that the disclosed spare wheel winch overcomes the challenges faced by known spare wheel winches by providing effective and practical arrangements that allow the cable to be payed out in a controlled manner based on a predetermined degree of force applied to the cable. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A winch for a spare wheel of a vehicle, the winch comprising:
   a sheave having a cable-winding surface;
   a torque plate operatively associated with said sheave, said torque plate having a fixed extension; and
   a sheave housing having an interior and a breakaway feature, said breakaway feature extending from said interior and being operatively associated with said fixed extension of said torque plate, said breakaway feature including two spaced apart frangible walls, said fixed extension being positioned between said walls,
wherein said breakaway feature is tearable upon contact with said fixed extension.

2. The winch for a spare wheel of a vehicle of claim 1, wherein said winch further includes a cover plate attached to said sheave housing, said breakaway feature being formed on said cover plate.

3. The winch for a spare wheel of a vehicle of claim 2, wherein said cover plate includes a recessed area for receiving said fixed extension.

4. The winch for a spare wheel of a vehicle of claim 3, wherein said frangible walls are formed in said recessed area.

5. The winch for a spare wheel of a vehicle of claim 1, wherein said torque plate includes a substantially planar body and wherein said fixed extension is coplanar with said planar body.

6. The winch for a spare wheel of a vehicle of claim 5, wherein said sheave housing includes an interior wall and wherein said breakaway feature extends from said interior wall.

7. The winch for a spare wheel of a vehicle of claim 6, wherein said breakaway feature is a single frangible tab.

8. A winch for a spare wheel of a vehicle, the winch comprising:
a sheave having gear teeth;
a torque plate operatively associated with said sheave, said plate having a gear and an extension;
a sheave housing having an interior; and
a breakaway feature selected from the group consisting of frangible gear teeth and a tab extending from said interior and being operatively associated with said extension, said tab being tearable upon contact with said extension, each of said gear teeth including a frangible base, said frangible base being attached to said sheave.

9. The winch for a spare wheel of a vehicle of claim 8, wherein said winch further includes a cover plate attached to said sheave housing, said breakaway feature being formed on said plate.

10. The winch for a spare wheel of a vehicle of claim 9, wherein said plate includes a recessed area for receiving said fixed extension.

11. The winch for a spare wheel of a vehicle of claim 10, wherein said breakaway feature includes two spaced apart frangible walls, said fixed extension being positioned between said walls.

12. The winch for a spare wheel of a vehicle of claim 11, wherein said frangible walls are formed in said recessed area.

13. The winch for a spare wheel of a vehicle of claim 8, wherein said torque plate includes a substantially planar body and wherein said fixed extension is coplanar with said planar body.

14. The winch for a spare wheel of a vehicle of claim 12, wherein said sheave housing includes an interior wall and wherein said breakaway feature extends from said interior wall.

15. The winch for a spare wheel of a vehicle of claim 14, wherein said breakaway feature is a single frangible tab.

16. A winch for a spare wheel of a vehicle, the winch comprising:
a sheave having a gear portion and a portion having a cable-winding surface;
a torque plate operatively associated with said sheave;
a sheave housing having an interior;
a breakaway feature defined by a circular pattern that allows separation of said gear portion of said sheave from said portion of said sheave containing said cable winding surface.

17. The winch for a spare wheel of a vehicle of claim 16, wherein said pattern of breakaway features includes holes formed in said sheave.

18. The winch for a spare wheel of a vehicle of claim 17, wherein said holes are elongated slots.

* * * * *